UNITED STATES PATENT OFFICE.

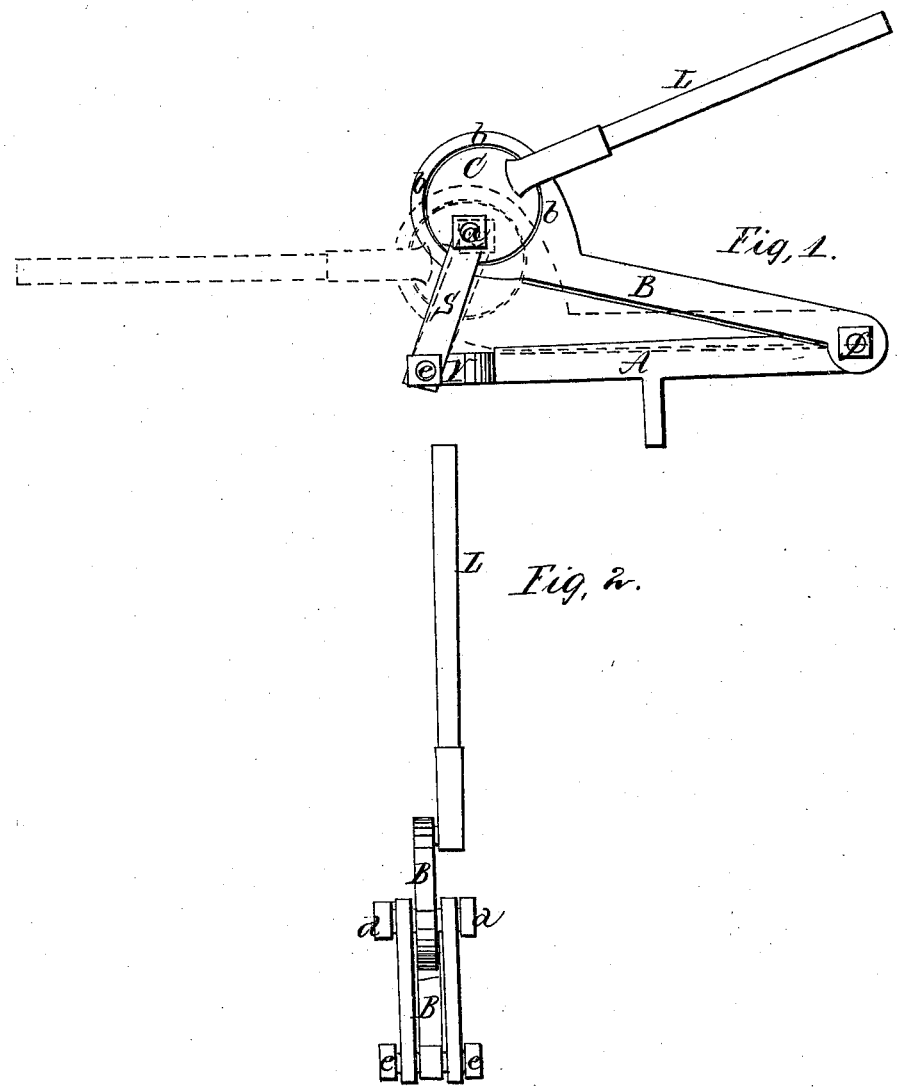

JOHN HILL, OF CHARLOTTE, MICHIGAN, ASSIGNOR TO HIMSELF AND WILLIAM ADAMS.

IMPROVEMENT IN BENCH-SHEARS.

Specification forming part of Letters Patent No. 93,715, dated August 17, 1869.

Be it known that I, JOHN HILL, of Charlotte, Eaton county, Michigan, have invented certain new and useful Improvements in Shears for Cutting Metal; and I do hereby declare that the following is a full, clear, and exact description thereof, reference being had to the accompanying drawings, and the letters of reference marked thereon, in which—

Figure 1 represents a side view, and Fig. 2 represents an end view.

My invention relates to that class of shears designed for use by hand, known as "bench-shears;" and consists, principally, in the peculiar mode of applying the power, and, incidentally, in securing the ends of the shears, so as to prevent springing of the blades.

To enable others skilled in the art to make and use my invention, I will proceed to describe its construction and operation.

The shears consist of two blades, A and B, two straps, S S, a circular disk, C, and a lever, L, connected and arranged as hereinafter set forth. The lower blade has the usual cutting-edge and tang, and has a shoulder, Y, somewhat advanced from the line of the rest of the blade, on which the eye $b\ b\ b$ of the upper blade rests when the shears are closed. This blade is secured at one end to the blade B by the pivot-bolt $f$. The upper blade, B, has the usual cutting-edge, and at the end opposite the pivot-bolt $f$ is formed into an eye, $b\ b\ b$, in which the circular disk C revolves. This disk is held in place by the metallic straps S S, secured at a suitable distance from the center of the disk by the pivot-bolt $d$ passing through them and through the disk. The lever L is firmly fixed to the disk C, near the circumference, at such angular distance from the pivot-bolt $d$ as may be found requisite. (In the accompanying drawing that distance is about one hundred and twenty degrees.) The metallic straps S S are fastened to the shoulder Y by the pivot-bolt $e$, passing through them and through the shoulder.

By pulling the lever forward in the direction of the red lines the upper blade is forced upon the lower, cutting the interposed metal. The shears are opened by reversing the motion of the lever.

The shears may be made of any suitable material, and the proportions of the component parts to each other may be varied, as is found best fitted for the development of the power and the nature of the work to be done.

Although I have described the circular disk as revolving in an eye in the upper blade, the shears may be made with the circular disk pivoted to either the upper or lower blade and connected by means of straps or stirrups to the other, substantially as described.

Claim.

What I claim as my invention, and desire to secure by Letters Patent, is—

In the construction of bench-shears, the combination of a circular disk inclosed by or attached to one of the shear-blades, and connected to the other blade by a stirrup or other equivalent device, pivoted eccentrically to said disk and mechanism, by means of which said disk may be rotated, the combination being and operating substantially as described.

In testimony whereof I have signed my name to this specification before two subscribing witnesses.

JOHN HILL.

Witnesses:
A. C. WALTERS,
F. A. HOOKER.